Figure 1:
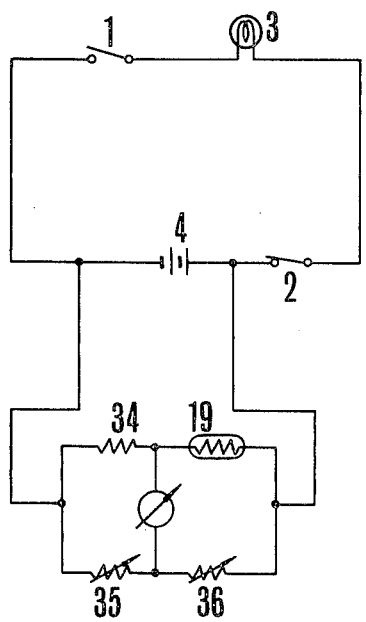

United States Patent [19]
Taguchi et al.

[11] 3,903,530
[45] Sept. 2, 1975

[54] CAMERA HAVING A FINDER ILLUMINATION DEVICE

[75] Inventors: Tatsuya Taguchi, Tokyo; Nobuaki Date, Kawasaki, both of Japan

[73] Assignee: Canon Kabushiki Kaisha, Tokyo, Japan

[22] Filed: Apr. 1, 1974

[21] Appl. No.: 456,851

[30] Foreign Application Priority Data
Apr. 4, 1973  Japan.................. 48-38504

[52] U.S. Cl. .................. 354/53; 354/155; 354/219; 354/289
[51] Int. Cl.² .............. G03B 17/20; G03B 19/12; G03B 13/02; G03B 17/100
[58] Field of Search ....... 354/53, 54, 152, 155, 219, 354/289

[56] References Cited
UNITED STATES PATENTS
| | | | |
|---|---|---|---|
| 3,091,167 | 5/1963 | Estes | 354/53 X |
| 3,106,141 | 10/1963 | Estes | 354/53 X |
| 3,736,850 | 6/1973 | Ishikawa | 354/155 X |

*Primary Examiner*—Richard A. Wintercorn
*Attorney, Agent, or Firm*—Toren, McGeady and Stanger

[57] ABSTRACT

In a camera having such an information indication member as a scale plate, a pointer, etc. to indicate photographing informations such as a diaphragm aperture value, a shutter value, etc., and other conditions of the camera within a finder, and an illumination device for enabling said informations to be seen in a dark place. A finder illumination device is provided to clamp the indication member of an exposure meter as the inside of the finder is illuminated for preventing the exposure meter from making erroneous indication when the illuminating light is made incident into the light receiving element of the exposure meter positioned near the finder optical path.

3 Claims, 3 Drawing Figures

CAMERA HAVING A FINDER ILLUMINATION DEVICE

The present invention relates to a finder of a camera, more particularly relates to a device to illuminate the photographing information indicated within a finder in a camera having an exposure meter in which its light receiving element is positioned near a finder optical system.

A camera in which the photographing information can be indicated within a finder has been known conventionally. But this conventional camera has a shortcoming in that the information indicated within the finder is difficult to see when the environment is dark. Also a camera is also known in which the information indicated as mentioned above is illuminated by a lamp to improve said shortcoming. But in a single lens reflex camera having a so-called TTL type exposure meter in which the light receiving element of the exposure meter is positioned behind a photographing lens, when the light receiving element is placed near a finder optical system, as the inside of the finder is illuminated by a lamp the light beam from the lamp is incident on the light receiving element of the exposure meter leading the device to make erroneous light sensing, or film is exposed to the light of the lamp at the time of exposure to give adverse effect over a picture image. If a light shielding plate is provided within the finder to stop the lamp light from coming incident on the light receiving element or film for avoiding the above mentioned adverse effect, the structure becomes very complicated.

The present invention intends to eliminate the above mentioned shortcomings and to provide a finder having an illumination device which can illuminate the information indication member without giving adverse effects to the exposure meter and the film.

To that end, in the present invention the illuminant to illuminate the information indication part is activated and extinguished in association with a member which clamps the exposure meter pointer and a shutter release member. Further, the illuminant is activated only when the movable pointer of the exposure meter is clamped in a state wherein the shutter charge and film feeding are completed, and is extinguished during the time the shutter is opened and closed.

Because of the above mentioned set up, the movable member of the exposure meter is always clamped when the inside of the finder is illuminated, thus it is possible to read the information within the finder without giving adverse effects to the exposure meter, and as the illumination is put out when the shutter is opened and closed no bad effects are given to exposure.

Figure 2:
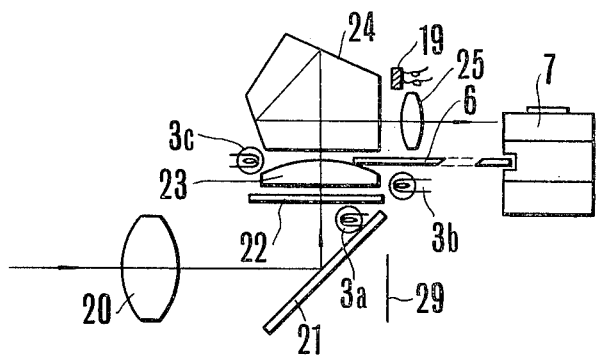
Figure 3:
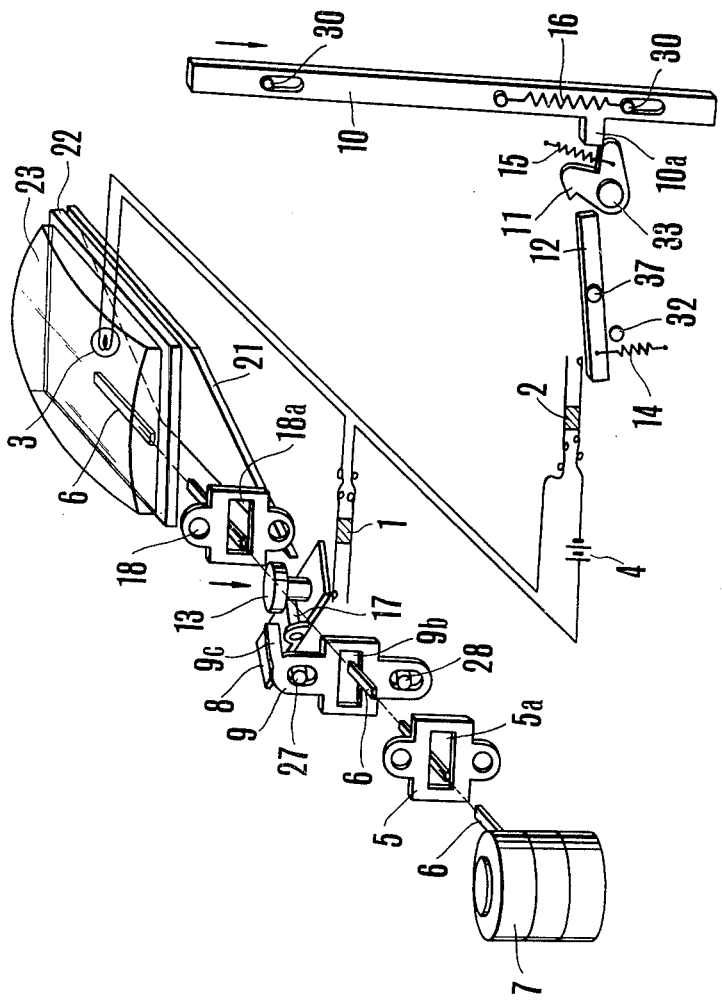

Now an example of the present invention will be explained referring to the drawings. FIG. 1 is a circuit diagram for controlling the illuminant. FIG. 2 is a schematic drawing to show the arrangement of a finder optical system and an illuminant. FIG. 3 is a schematic drawing to show a mechanism to control the illumination device. In FIG. 1, 1 is a normally open switch, being closed in an association with clamping action of the meter pointer, 2 is a switch opened and closed in an association with the shutter. 3 is an illuminant, for which an electric bulb or light-emitting diode, etc. are used. 4 is a power source which is used commonly for the above mentioned illuminating circuit and an exposure meter circuit connected in parallel with said illuminating circuit, wherein the exposure meter circuit consists of, as has been known conventionally, a light receiving element 19, a fixed resistor 34, variable resistors 35, 36 which are linked with the setting of photographing conditions such as shutter speed, film sensitivity, etc., and a meter 7.

In FIG. 2, 20 is a photographing lens, 21 is a movable mirror to have the light penetrating through the photographing lens proceed to a focal plane 22. 23 is a condensor lens. 24 is a pentagonal prism. 25 is a finder ocular. The light receiving element 19 is positioned behind the pentagonal prism 24 to receive the light which passes through the photographing lens 20 and is reflected by the movable mirror 21 then is imaged on the focal plane 22, through the condensor lens 23 and the penta-prism 24. The pointer 6 of the meter 7 is so positioned that it can be rotated in a space between the condensor lens 23 and the pentagonal prism 24, and a scale plate, although not shown in the drawing, is placed near the rotating plane of said pointer 6 to indicate photographing informations as shutter speed, diaphragm aperture value, etc., and these indication members are observed by a camera operator through the ocular lens 25 and the pentagonal prism 24. 29 shows a film. The illuminant 3 can be provided at a convenient place such as the position shown by 3a at the lower part of the condensor lens 23, the position shown by 3b at its side part, or the position shown by 3c at its upper part, etc.

In FIG. 3, elements 5 and 18 are meter pointer holding plates fixed to the camera, and have openings 5a, 18a through which pointer 6 is disposed. Accordingly, pointer 6 freely moves within the openings 5a, 18a in response to the brightness of the object. 8 is an elastic lever which can swing around a fixed axle 17 and has a button 13 for clamping the pointer planted on one end thereof. A first switch 1 for illumination circuit is provided below said lever 8 so that it is closed as the button 13 is pressed downward (to the direction shown by an arrow).

9 is a pointer clamping plate to engage with the above mentioned lever 8 with its arm 9c, and has an opened part 9b through which the pointer 6 goes, and is so supported as can swing up and down being guided by axles 27, 28 fixed on the camera body, being pulled by a weak spring normally and being stopped at a position to allow rotation of the pointer 6.

10 is a shutter release rod and is so supported that it can be slided up and down being guided by an axle 30, further, is biased upward by a spring 16. 12 is a switch lever to activate a second switch 2 of the illumination circuit, and is so axially supported as can be rotated around a fixed axle 37, and further it is biased in such a direction so as to open the switch 2 by a spring 14, wherein one end thereof can engage with a lock lever 11. Said lock lever 11 is supported in a freely rotatable manner around a fixed axle 33, wherein one arm thereof is biased by a spring 15 in such a direction so as to engage with an arm 10a of the above mentioned release rod. 32 is a stopper for a switch lever 12.

The switch lever 12 is rotated against the spring 14 by a mechanism not shown in the drawing at the time of shutter charge to close the switch 2, wherein one end of said lever engages with a forward end of the above mentioned lock lever 11 and is locked at said position. At this time as the switch 1 is opened the illuminant is not lighted.

When a camera is pointed toward an object in this state the meter pointer is swung to such a position as corresponding to the amount of light incident into the light receiving element. When environmental light is bright as the pointer, the diaphragm scale and the shutter speed, etc. can be observed without any additional handling, the exposure condition can be set, while viewing through a finder, depending on the pointer of an exposure meter.

In a dark place as the clamp button 13 is slightly pressed down in the direction of an arrow the other end of the lever 8 is shifted upward to shift the position of the clamp plate 9 which engages therewith to upward direction. At this time the lower end of the opened part 9b of the clamp plate comes in contact with the pointer 6 to press the pointer 6 against the opened part edges of the pointer holding plates 5, 18. As the button 13 is pressed down further, the lever 8 is bent to press the contacting piece of the switch 1 for closing the switch 1, thus the illuminant 3 is lighted to illuminate the inside of the finder. At this time as the meter pointer is clamped as mentioned above even if the illuminating light is incident on the light receiving element the meter pointer is not swung, therefore the indication of the exposure value will not be changed and can be observed within a bright finder field of vision.

When the shutter release rod 10 is pressed in the direction of arrow while the button 13 is kept pressed down, the arm 10a thereof presses down against the spring 15, one end of said lock lever 11 to rotate the lever 11 in a clockwise direction around the axle 33, therefore the forward end thereof releases the switch lever 12. By this, said lever 12 is pulled by the spring 14 and is rotated in a counterclockwise direction, then the second switch 2 which has been pushed by said lever 12 and closed is opened by its own elasticity to put out the lamp.

As the release rod 10 is pressed down further, in a well known procedure after the movable mirror 21 jumps up to photographing position and the diaphragm is stopped down to the preset value, the shutter is opened and released, and as the lamp 3 is put out as mentioned above the film 29 will not be affected at all.

After photographing while shutter release rod 10 returns to its upper original position being pulled by the spring 16, the switch lever 12 is pulled by the spring 14 and is stopped as it comes in contact with the stopper 32. Therefore the switch 2 is kept in off state until next shutter charge action is taken. The first switch follows the return of the clamp plate 9, when the pressing of the button 13 is stopped, and is opened.

While the exposure meter circuit is made up as a bridge circuit in the above example, the present invention is not limited thereto. Instead various known circuit set ups can be employed, also such set up can be used that the exposure value may be set manually, or may be automatically set according to the indication of the exposure meter that is by a so-called EE mechanism.

What is claimed is:

1. In a camera having a finder illumination device, a shutter and a shutter release member, comprising:

an exposure meter having a light receiving element provided adjacent to a finder optical path and a movable member which is shifted in response to the amount of light received by said light receiving element;

a photographic information indicating element positioned within said finder optical path;

an illumination circuit including means to illuminate said indicating element, a power source and a first switch;

means for clamping said movable member of said exposure meter, said clamping means cooperating with said switch of said illumination circuit so as to close said switch when said movable member is clamped; and a second switch cooperating with said shutter release member for opening the illumination circuit during the opening and closing of said shutter.

2. The camera of claim 1 wherein said second switch is normally closed so as to allow actuation of said illuminating means when said clamping means is operated.

3. The camera of claim 2 wherein said second switch is held in said normally closed position by a switch operating member in cooperation with a locking member, said locking member releasing said switch operating member by the action of said shutter release member.

* * * * *